April 12, 1966  E. J. BACINO ETAL  3,245,429
POPPET VALVE
Filed Jan. 8, 1963
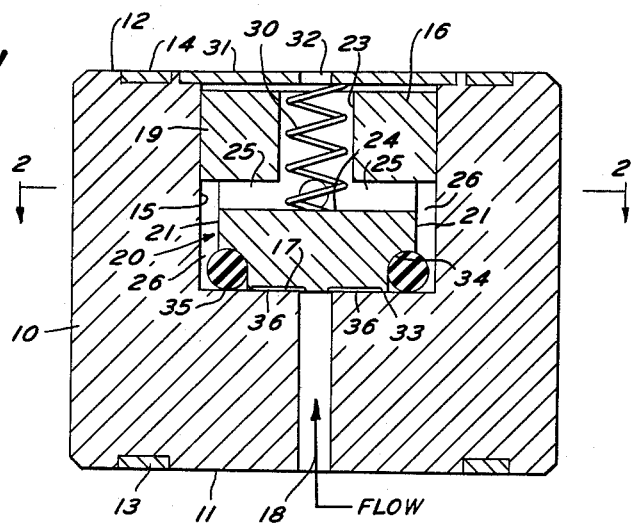
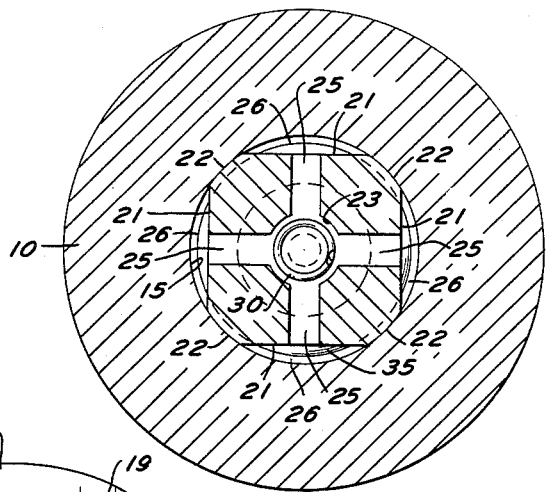
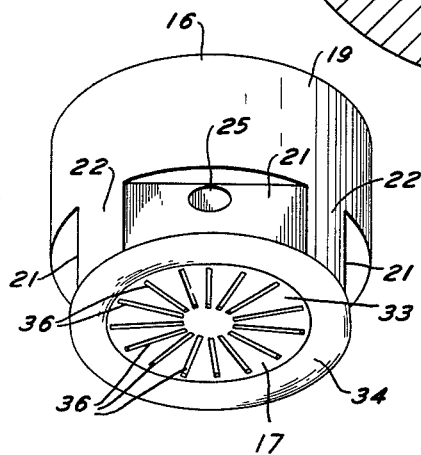
INVENTORS
EIGEL J. BACINO
JOHN C. BOWEN
BY
*B. T. Wolbersmith*
ATTORNEY

3,245,429
POPPET VALVE
Eigel J. Bacino, Huntingdon Valley, and John C. Bowen, Davisville, Pa., assignors to Pressure Products Industries, Inc., Hatboro, Pa., a corporation of Pennsylvania
Filed Jan. 8, 1963, Ser. No. 250,108
5 Claims. (Cl. 137—543.21)

This invention relates to poppet valves and more particularly to such valves for use on very small high pressure pumps.

Difficulties have been encountered with poppet valves heretofore available for use in small high pressure pumps, because of metal to metal contact with attendant noise and further because of the deformation resulting from the repeated metal to metal contact.

It has heretofore been proposed to employ sealing rings for seating to prevent fluid flow. The patent to Adams, No. 2,608,376 shows such a construction but has the objectionable characteristic of metal to metal contact.

It is the principal object of the present invention to provide a poppet valve particularly suited for small high pressure fluid pumps which is simple in construction and which is free from the objectionable characteristics of valves heretofore available.

It is a further object of the present invention to provide a poppet valve having a replaceable resilient sealing ring with which fluid flow is shut off having fluid access grooves extending toward but terminated short of the sealing ring.

It is a further object of the present invention to provide a poppet valve of the character aforesaid having a very small dead volume.

Other objects and advantageous features of the invention will be apparent from the description and claims.

The nature and characteristic features of the invention will be more readily understood from the following description taken in connection with the accompanying drawings forming part thereof, in which:

FIGURE 1 is a vertical central sectional view greatly enlarged of a preferred embodiment of a poppet valve in accordance with the invention;

FIG. 2 is a horizontal sectional view taken approximately on the line 2—2 of FIG. 1; and FIG. 3 is an enlarged perspective view, as seen from below, of the valve plug removed from the housing or cage and with the sealing ring also removed.

It should, of course, be understood that the description and drawings herein are illustrative merely, and that various modifications and changes can be made in the structure disclosed without departing from the spirit of the invention.

Referring now more particularly to the drawings, in which a preferred embodiment of the invention is illustrated, a valve cage or body 10 with one end face 11 and another end face 12 is provided for insertion in a pump cylinder head (not shown). The face 11 can have a gasket 13 therein and the face 12 can have a gasket 14 therein. Either face 11 or 12, as required can be inwardly or outwardly disposed, depending on whether the valve serves as an outlet, or an inlet valve. The body 10 has a central bore 15 extending to the end face 12 for the reception of the valve plug 16. The bore 15 has an inner end seating face 17 with a supply port 18 extending therefrom to the end face 11.

The valve plug 16 has a cylindrical guiding head portion 19 freely slidable in the bore 15 and an inner extension 20 with flat faces 21 and arcuate faces 22 on the periphery thereof.

The valve plug 16 has a central opening 23 therein with an inner end terminal 24. From the opening 23 fluid passageways 25 extend outwardly to the flat faces 21 for fluid delivery. The spacing of the flat faces 21 from the bore 15 provides passageways 26 communicating with the passageways 25 for fluid delivery.

The central opening 23 has a compression spring 30 therein abutting at one end at the end terminal 24 of the opening 23 and at the other end on a spring retainer and valve plug stop plate 31 inset in the outer face 12 and held therein in any desired manner. The plate 31 has a discharge or delivery port 32 therethrough.

The valve plug 16 has an inner end face 33 and extending therefrom an annular groove 34 is provided for the reception of a resilient packing ring 35, preferably an O-ring, which engages the seating face 17 to prevent fluid flow when it is held in engagement therewith by the plug 16. The ring 35 is spaced inwardly from the bore 15.

At the meeting location of the valve plug end face 33 and the seating face 17 provisions are made for preventing a differential seal from occurring because of the impact effect between these faces. This preferably takes the form of a plurality of radial grooves 36 between the faces 17 and 33, continuously communicating with the port 18 but terminated in spaced relation to the packing ring 35 to avoid displacement of the ring 35 thereinto under fluid pressure applied on the ring 35. The radial grooves 36 are shown as provided on the end face 33. In one preferred embodiment of the invention the grooves 36 are each of a width of 0.010 inch, of a depth of 0.004 inch, and the grooves 36 are spaced 24° apart.

In use, and whether the valve is operating as an inlet or a delivery valve, the valve plug 16 subject to differential of pressure thereon, moves to a position to separate the packing ring 35 from its engagement with the seating face 17. A fluid path is opened connecting the supply port 18 and the delivery port 32 through the bore 15, the passageways 26 and 25 and the opening 23.

The grooves 36, by providing access of fluid between the faces 17 and 33 but not to an extent to permit deformation under pressure of the ring 35 into the grooves 36, prevent a secondary seal from occurring near the bore 18. After a period of time this will occur if grooves 36 are not employed, and a high differential pressure is needed to move the valve poppet 19 away from the seat face 17. Thus, the present arrangement will avoid the hammering action which produces noise and damage to either these or other parts of the system to which the check valve is attached.

We claim:

1. A poppet valve comprising a body having a bore with an end seating face and with a delivery port, a central inlet port extending from said face, a valve plug in said bore having a portion establishing communication with said delivery port, said valve plug having between said portion and said port an extension, with an end face and an annular resilient packing member around said end face for engagement with said end seating face to cut off fluid flow, yieldable means for retaining said plug in said bore, and grooves in one of said faces in communication with said port, said grooves terminating in spaced relation to said packing member whereby displacement of said packing member into said grooves is avoided, said grooves being designed to present sufficient area exposed to inlet pressure to materially delay the formation of a secondary seal.

2. A poppet valve as defined in claim 1 in which said grooves are on the end face of said valve plug.

3. A poppet valve as defined in claim 1 in which said grooves are radially disposed on the end face of said valve plug.

4. A poppet valve as defined in claim 1 in which a spring retainer is provided carried by said body and a resilient member is interposed between said retainer and said valve plug urging said plug to a position with said packing in engagement with said end seating face.

5. A poppet valve comprising a body having opposite faces and a bore extending from one of said faces and having a portion for fluid delivery and terminating in spaced relation to the other of said faces to an end seating face, an inlet port extending from said end seating face to the other of said body faces, a valve plug in said bore yieldable means for retaining said plug in said bore, said plug having a guiding head with fluid passageways therein communicating with said body portion and an end extension having an end face, said extension having an annular end groove surrounding said end face and an annular resilient packing ring in said groove for engagement with said end seating face to shut off communication between said port and said fluid passageways, said end face having radially dispose grooves therein communicating with said port and terminating short of said packing ring whereby displacement of said packing ring into said grooves is avoided, said grooves being designed to present sufficient area to inlet pressure to materially delay the formation of a secondary seal.

References Cited by the Examiner
UNITED STATES PATENTS 2,608,376   8/1952   Adams _____ 137—543.17 X
2,959,188   11/1960   Kepner _____ 251—332 X ISADOR WEIL, *Primary Examiner.*